US009307817B1

(12) United States Patent
Kaiser

(10) Patent No.: US 9,307,817 B1
(45) Date of Patent: *Apr. 12, 2016

(54) CONFORMABLE COMPUTER HOLDER

(71) Applicant: Jeffrey Joesph Kaiser, Los Angeles, CA (US)

(72) Inventor: Jeffrey Joesph Kaiser, Los Angeles, CA (US)

(*) Notice: Subject to any disclaimer, the term of this patent is extended or adjusted under 35 U.S.C. 154(b) by 41 days.

This patent is subject to a terminal disclaimer.

(21) Appl. No.: 14/283,906

(22) Filed: May 21, 2014

Related U.S. Application Data

(63) Continuation-in-part of application No. 13/109,341, filed on May 17, 2011, now Pat. No. 8,757,374.

(60) Provisional application No. 61/345,247, filed on May 17, 2010, provisional application No. 61/885,120, filed on Oct. 1, 2013.

(51) Int. Cl.
| | |
|---|---|
| B65D 85/00 | (2006.01) |
| B65D 81/02 | (2006.01) |
| A45C 11/00 | (2006.01) |
| A45C 3/02 | (2006.01) |
| A45C 13/00 | (2006.01) |

(52) U.S. Cl.
CPC . *A45C 11/00* (2013.01); *A45C 3/02* (2013.01); *A45C 13/004* (2013.01); *A45C 2011/003* (2013.01)

(58) Field of Classification Search
CPC ........ G06F 1/166; F16M 11/10; F16M 11/40; F16M 13/00
USPC .......................... 206/320, 521, 522, 591–594; 108/42–44; 248/346.03, 346.2, 363; 248/371, 444, 454, 917; 361/679.01, 361/679.02, 679.55, 679.56
See application file for complete search history.

(56) References Cited

U.S. PATENT DOCUMENTS

| | | | | | |
|---|---|---|---|---|---|
| D24,803 | S | * | 10/1895 | Linn et al. ................ | D6/707.19 |
| 2,219,974 | A | * | 10/1940 | Bellow .................... | A24F 19/00 206/567 |
| 4,052,944 | A | * | 10/1977 | Jennings ............ | A47G 23/0608 108/43 |
| 5,887,777 | A | | 3/1999 | Myles | |
| 7,643,274 | B2 | * | 1/2010 | Bekele .................. | G06F 1/1616 206/320 |
| 7,992,502 | B1 | * | 8/2011 | Davis ..................... | A47B 23/04 108/43 |
| 8,925,721 | B2 | * | 1/2015 | Young ...................... | A45F 5/10 206/320 |
| 2009/0009938 | A1 | * | 1/2009 | Daley, III ................ | A45C 5/03 361/679.09 |
| 2009/0032421 | A1 | * | 2/2009 | Sween et al. ............ | A45C 3/02 206/320 |
| 2011/0056413 | A1 | * | 3/2011 | Andochick ............. | B42F 9/001 108/14 |
| 2012/0118770 | A1 | * | 5/2012 | Valls ..................... | F16M 11/10 206/320 |

* cited by examiner

*Primary Examiner* — Luan K Bui
(74) *Attorney, Agent, or Firm* — Creati Venture Law, LLC; Dennis JM Donahue, III

(57) ABSTRACT

A computer holder has a protective case and a conformable backing which is attached to the case. The case holds the computer, and the backing can be formed as a soft membrane or as an accordion-like bellows. The case may also include a feature for redirecting sound toward the user. The space within the backing can be selectively filled with small filling materials, a low viscosity fluid or a gas such as air, or may include a storage space. A two way valve, cap or handle can be attached to the backing to allow for a variation of the backing's fill level and shape. The computer holder can also serve as a bag, having a strap attached to the case and a pocket formed in the backing. The holder may also include a sound bar which can also function as a handle.

20 Claims, 15 Drawing Sheets

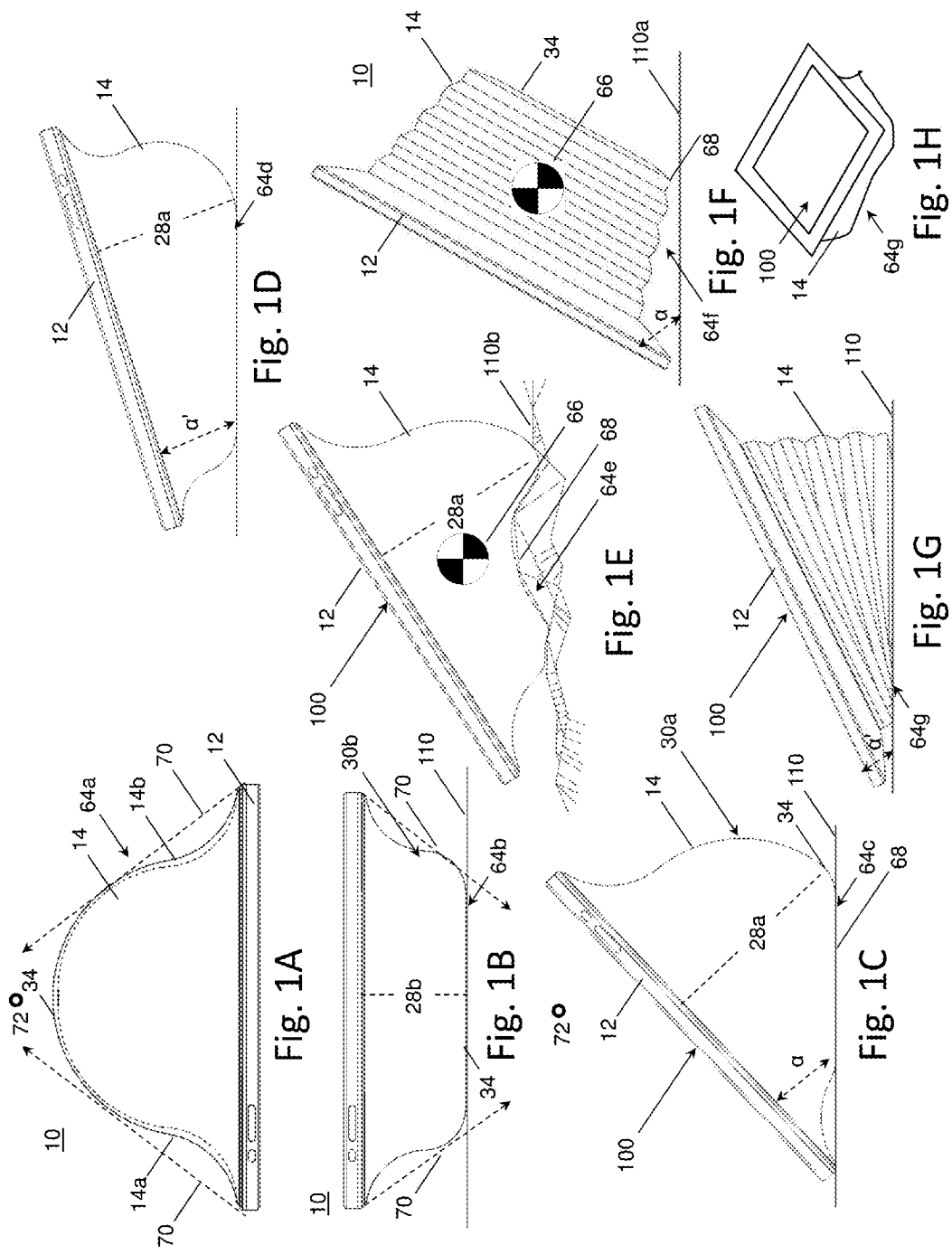

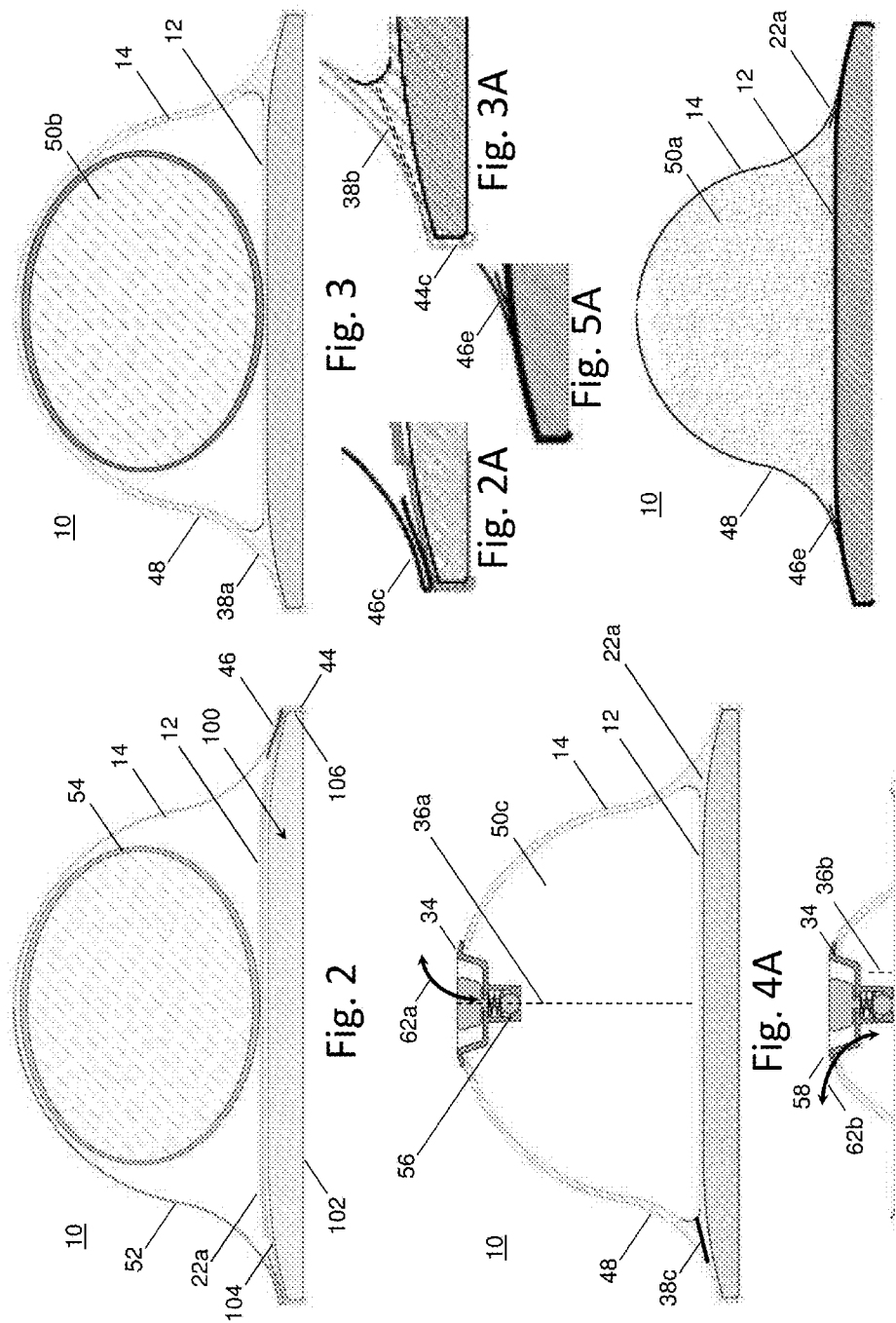

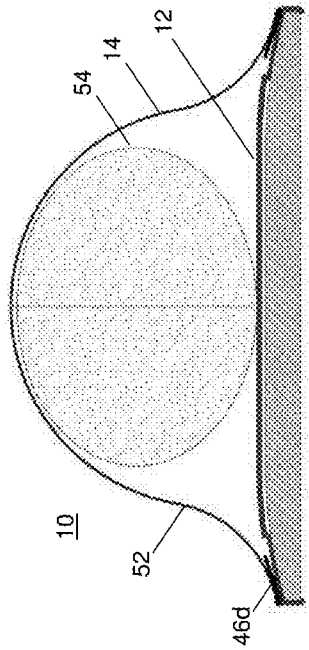
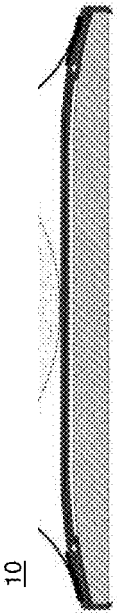
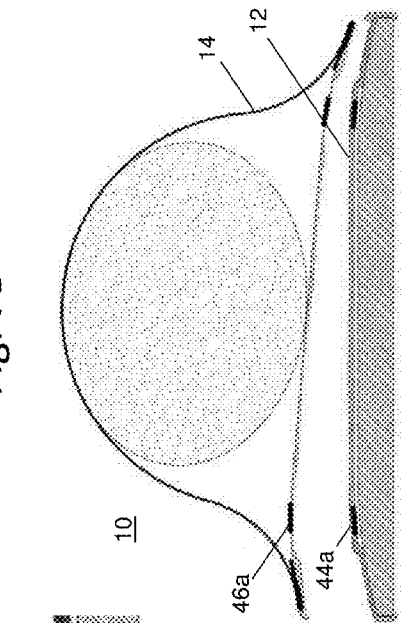
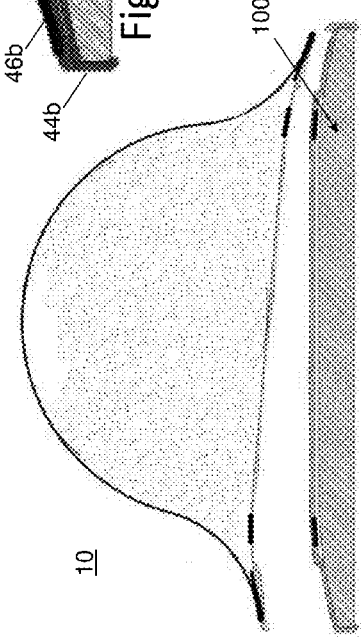
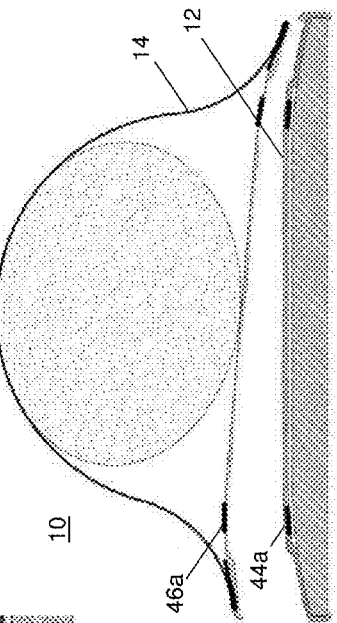

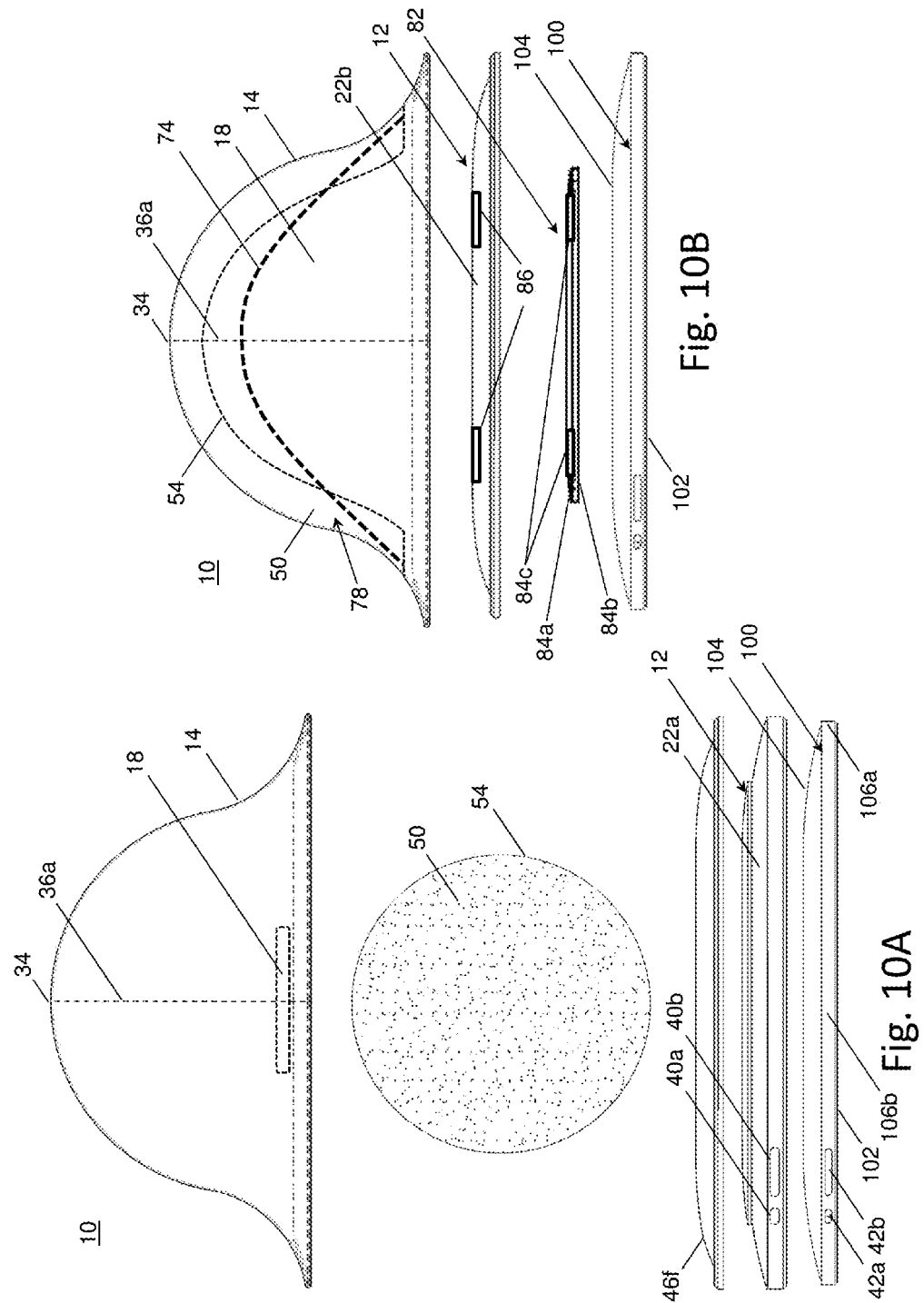

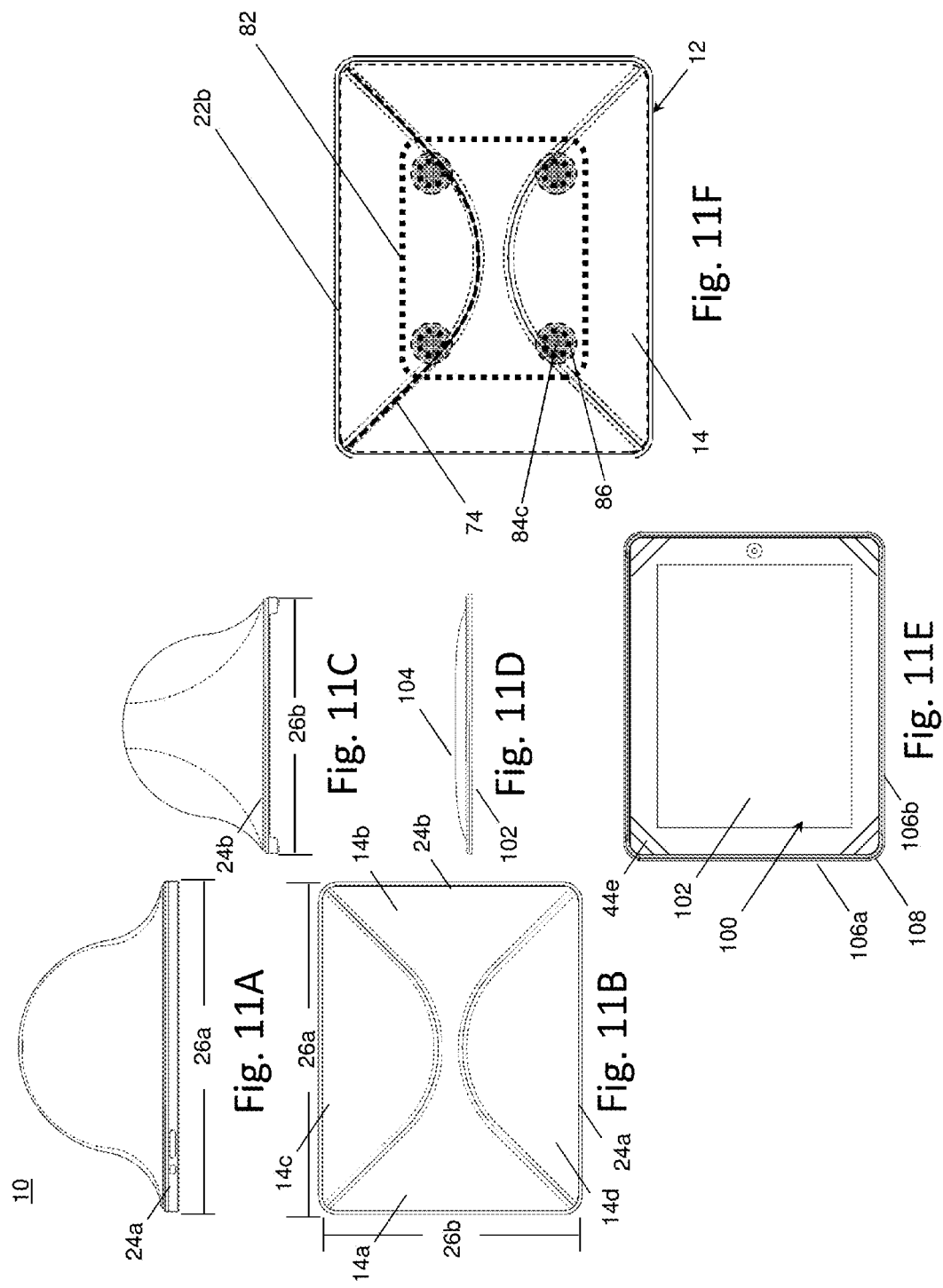

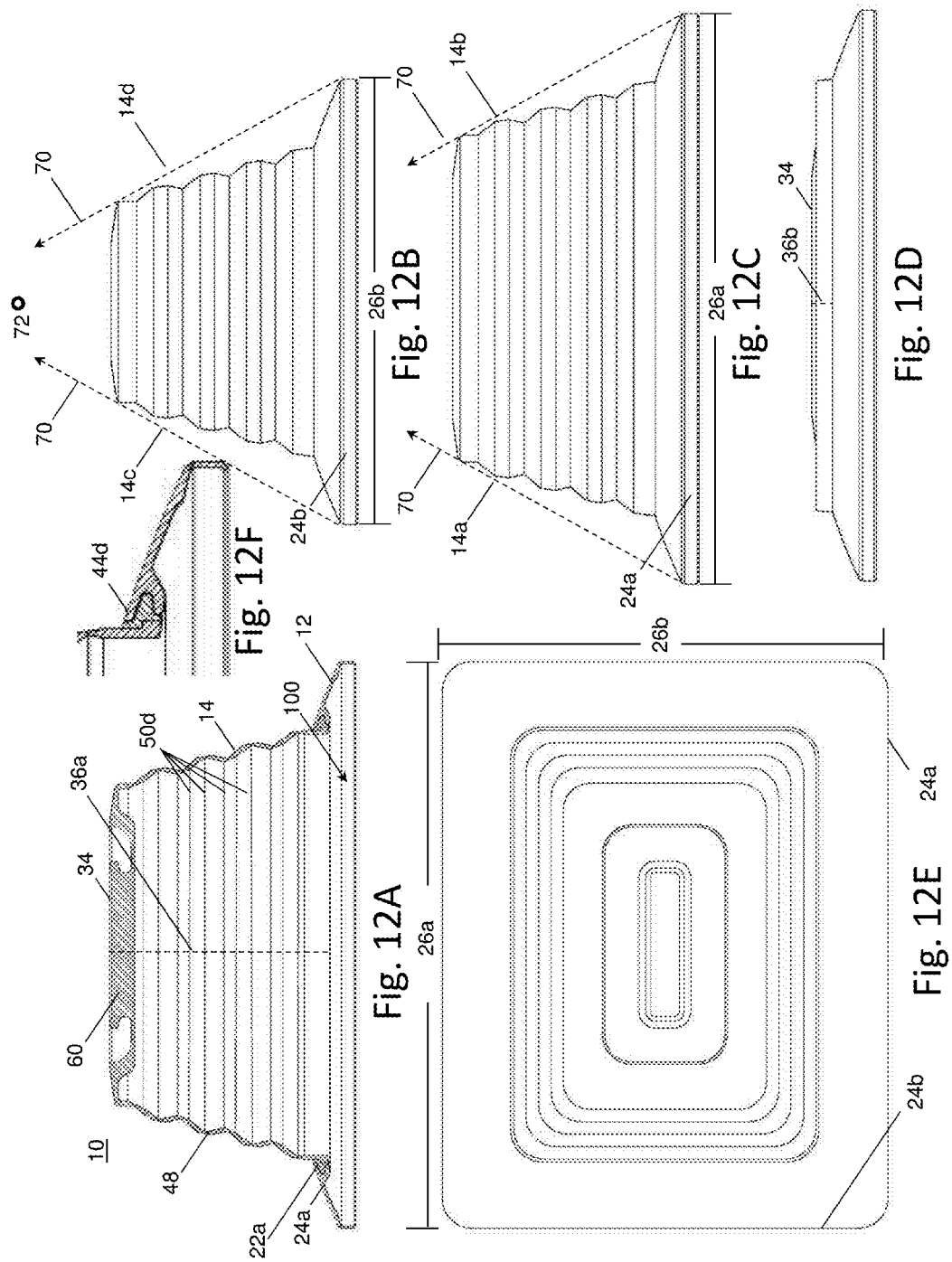

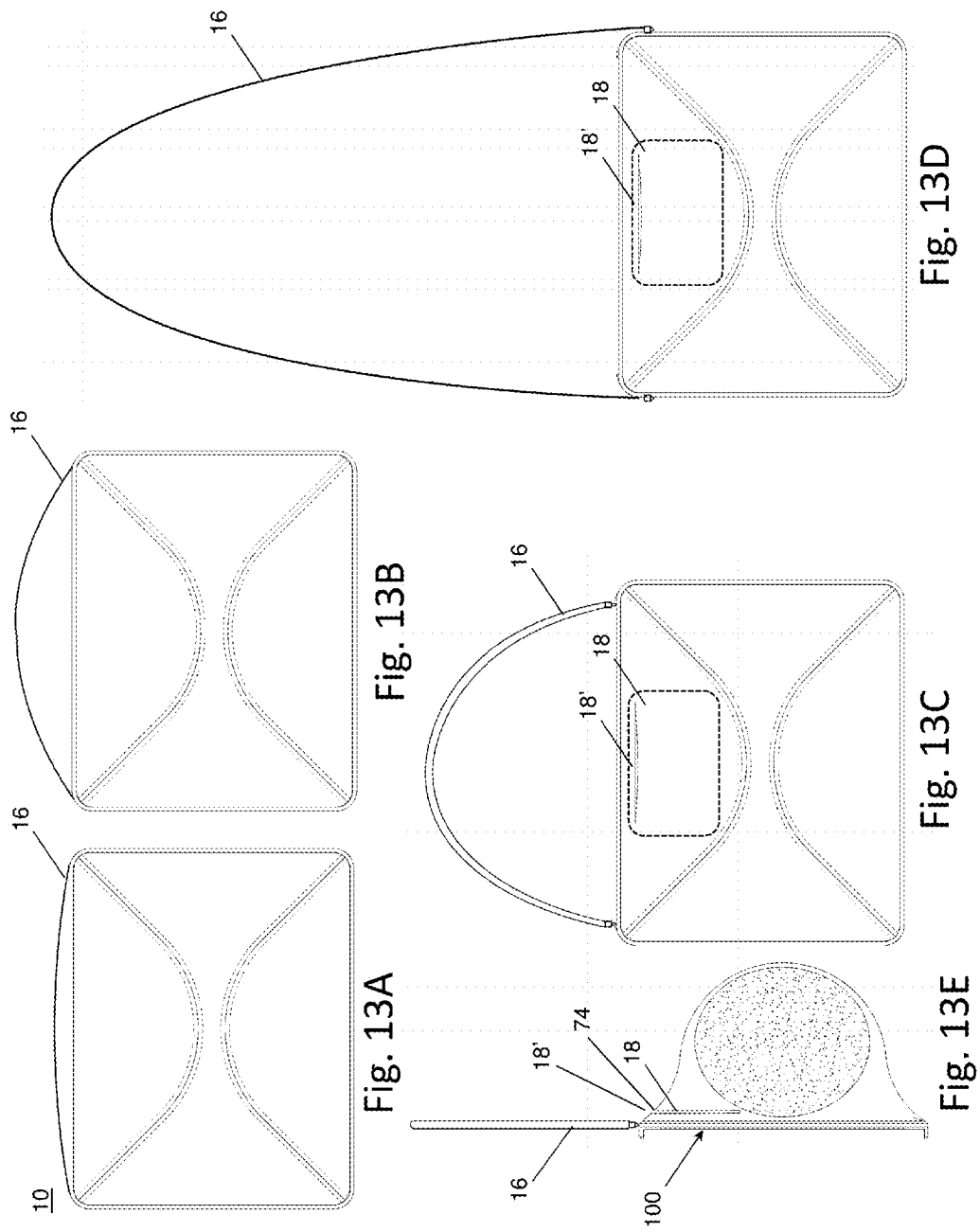

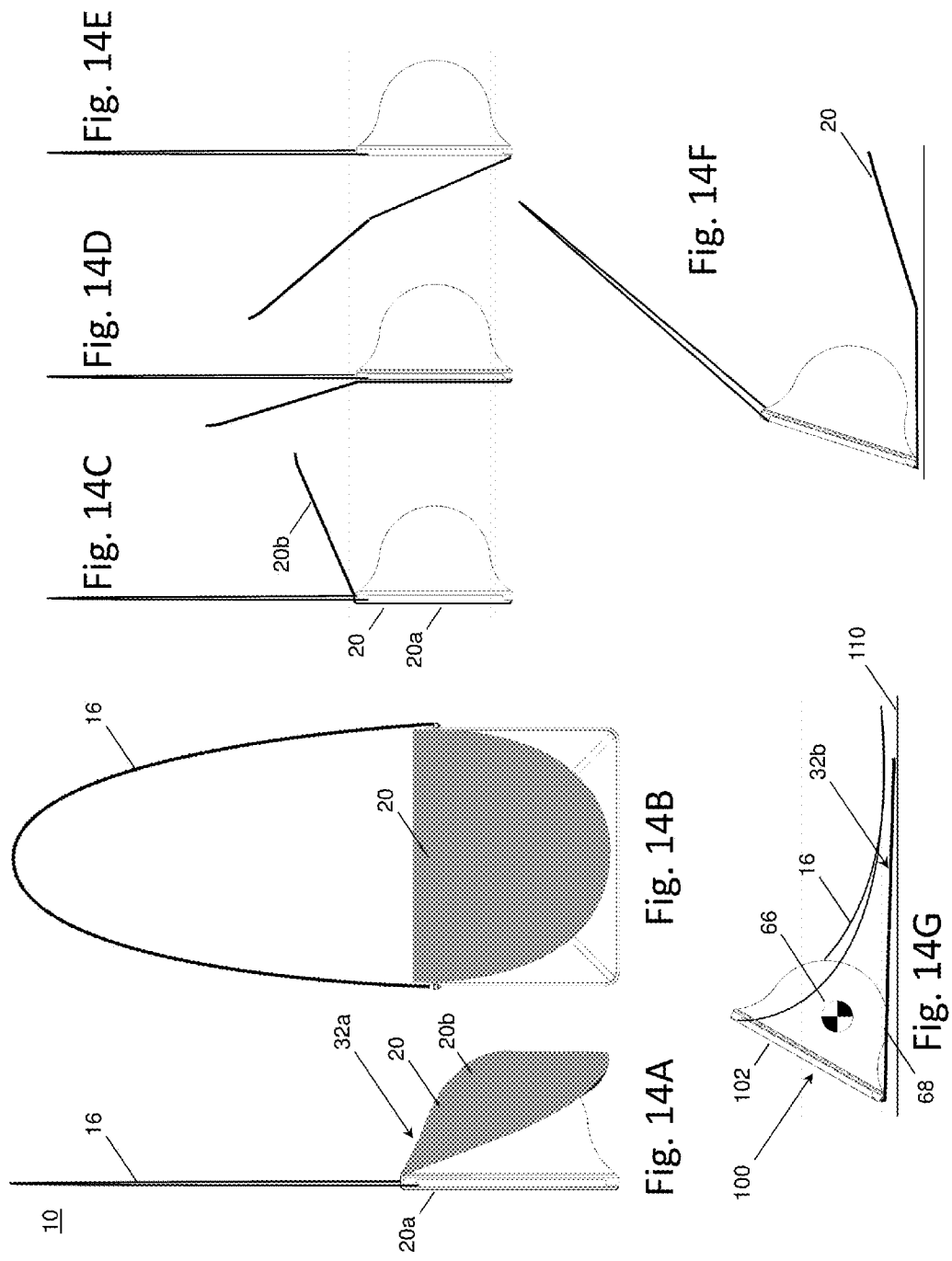

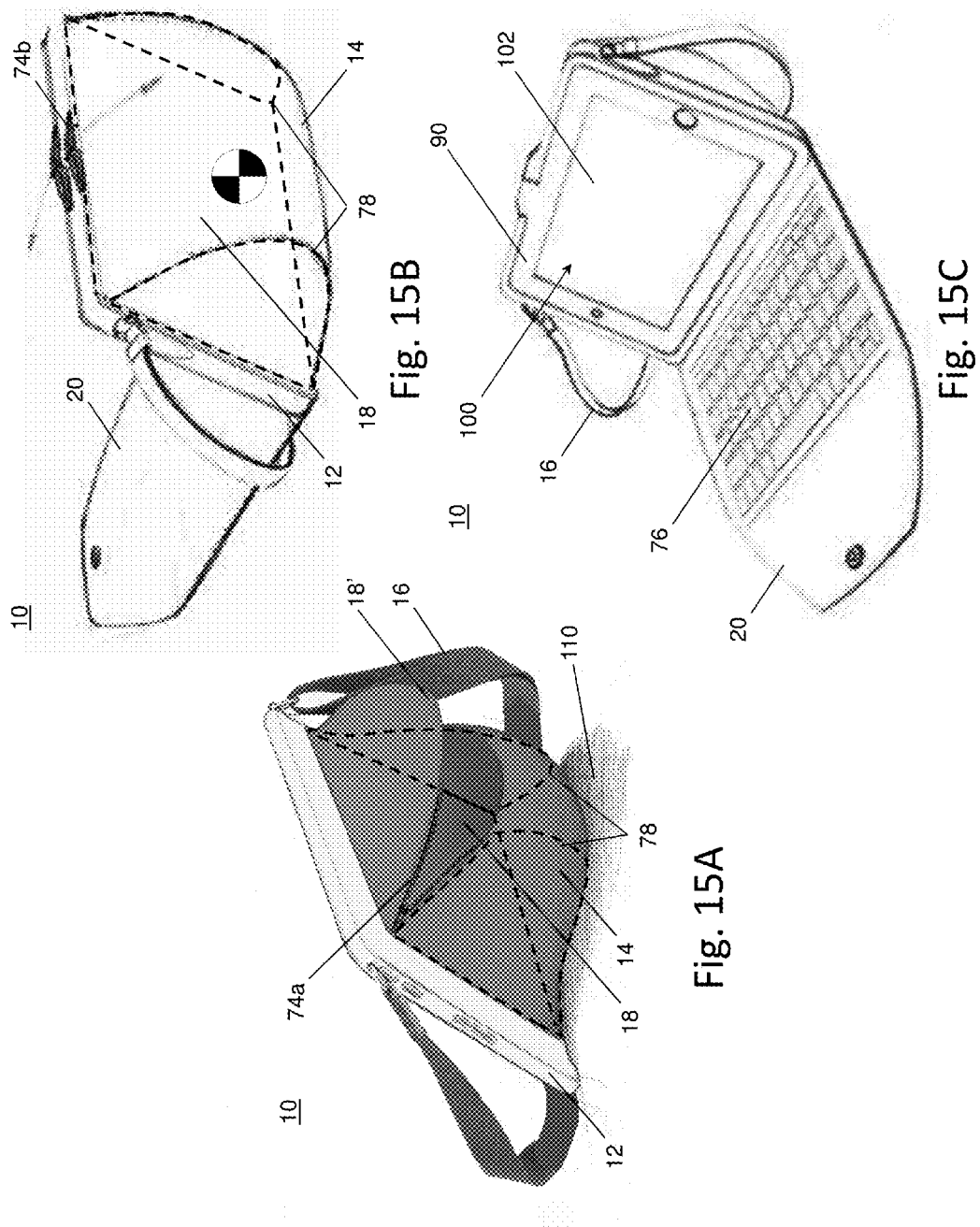

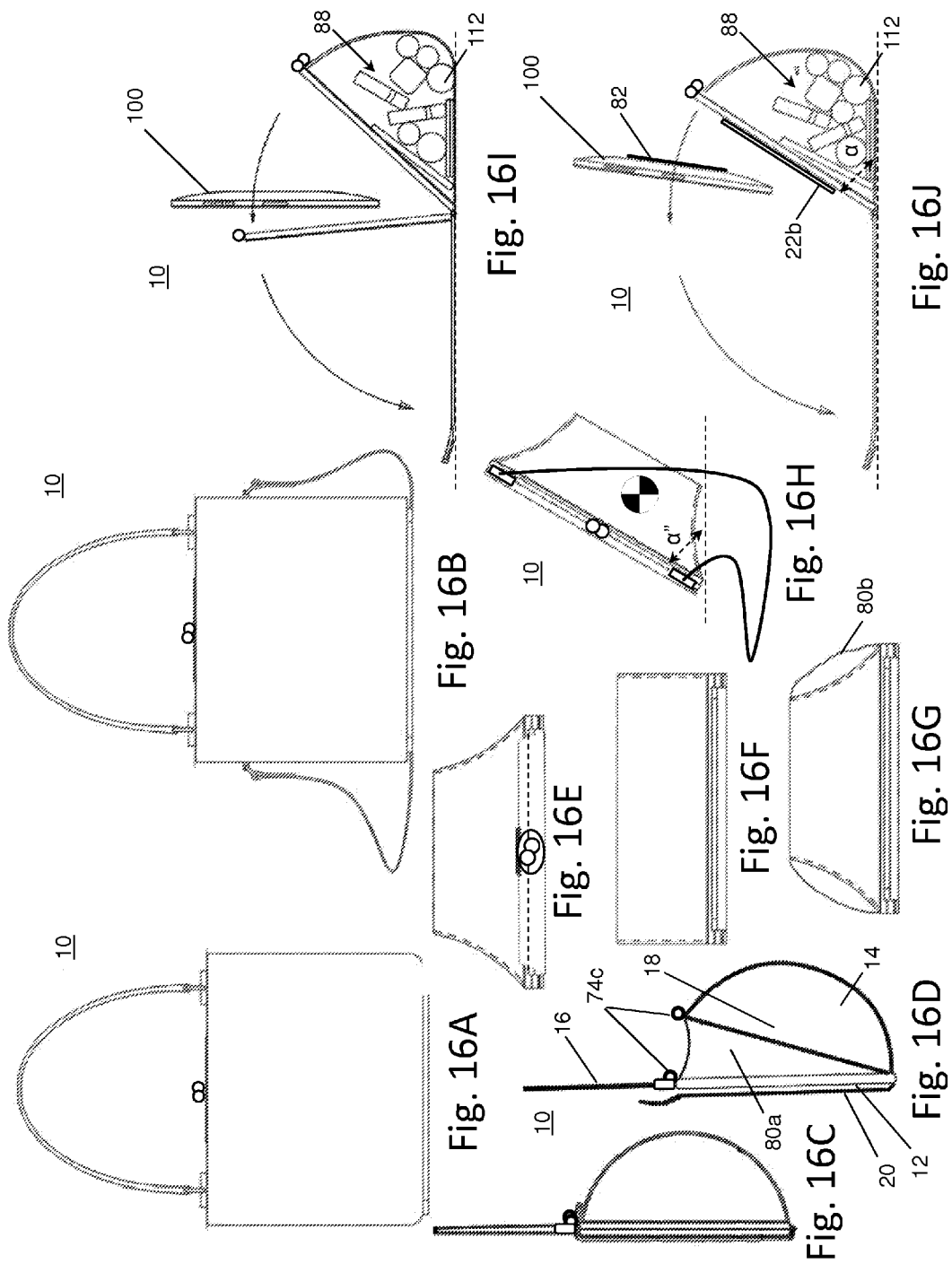

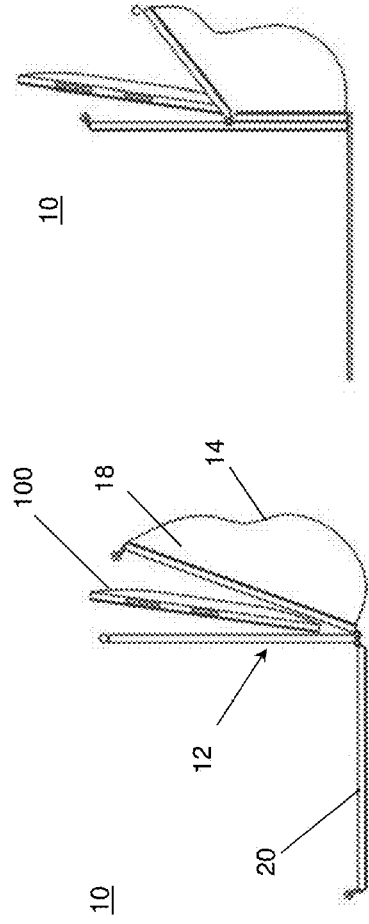
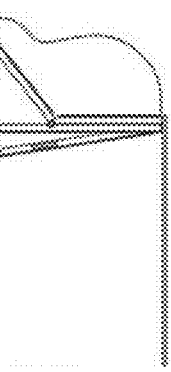
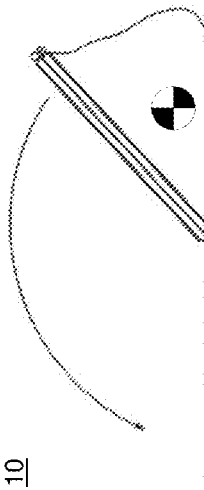

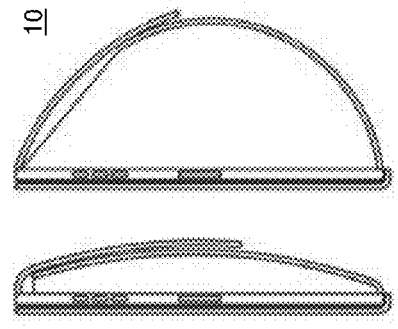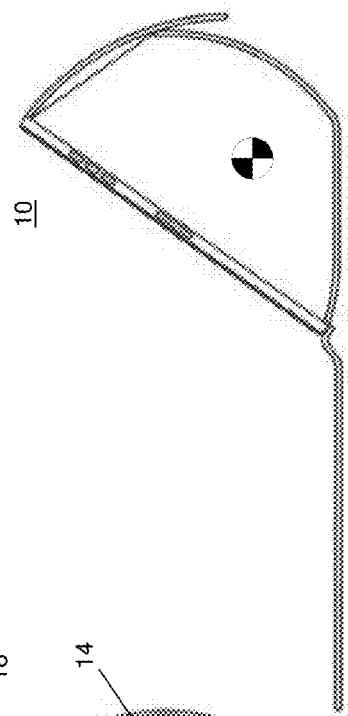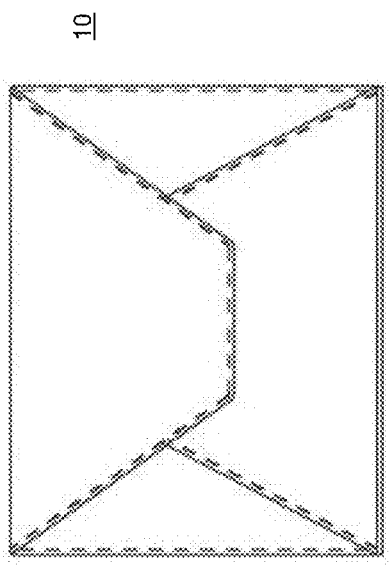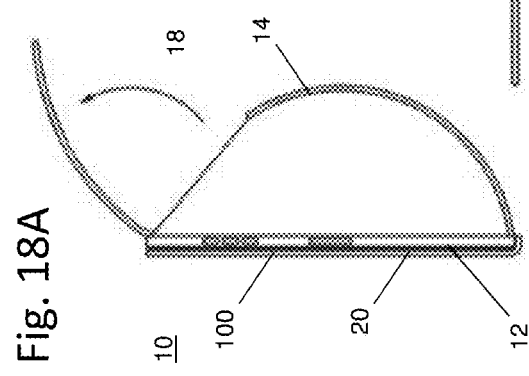
Fig. 18A  Fig. 18B  Fig. 18C  Fig. 18D  Fig. 18E

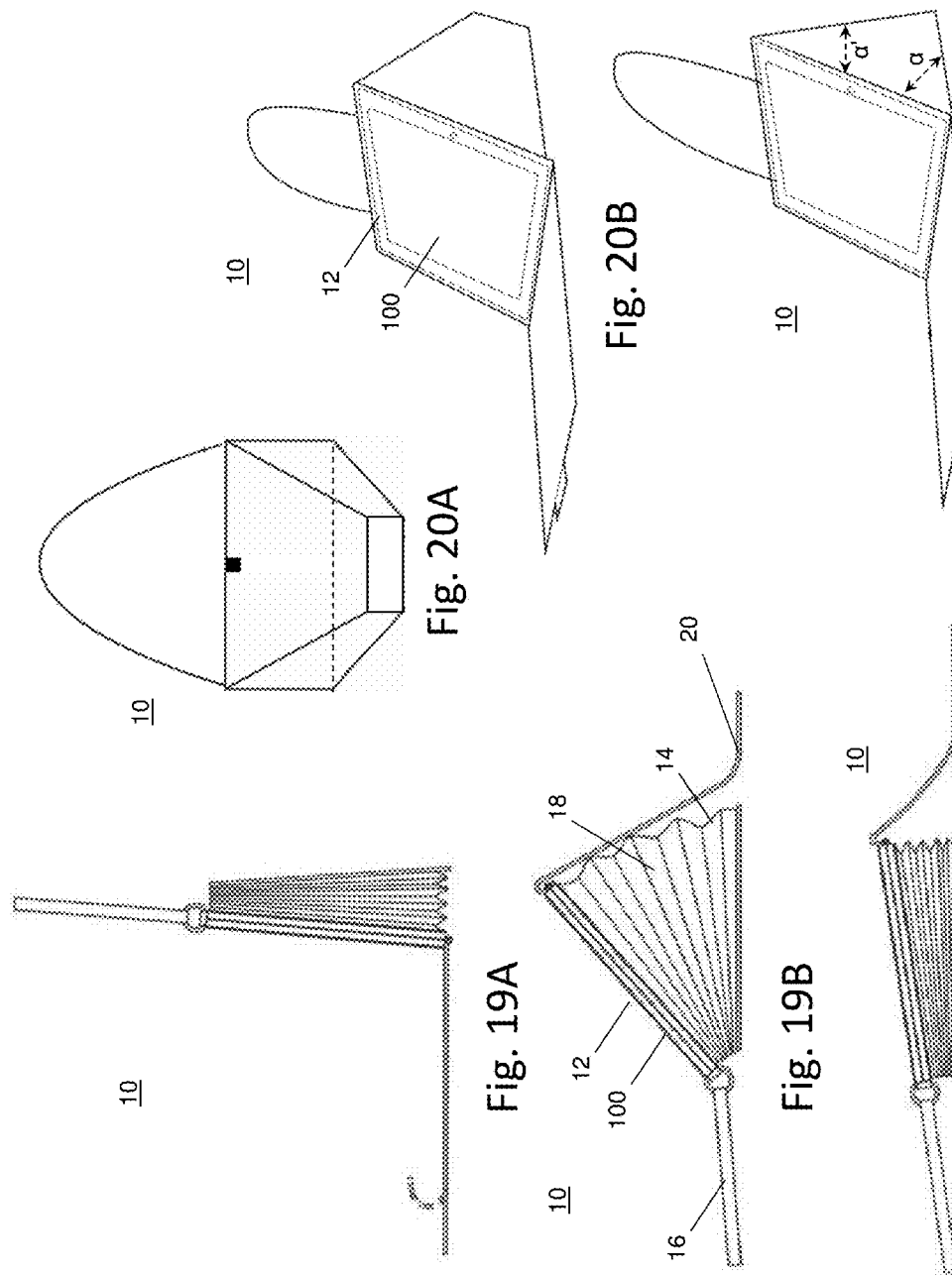

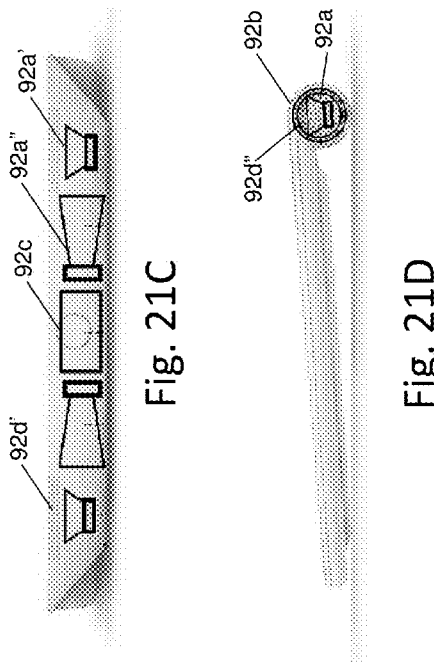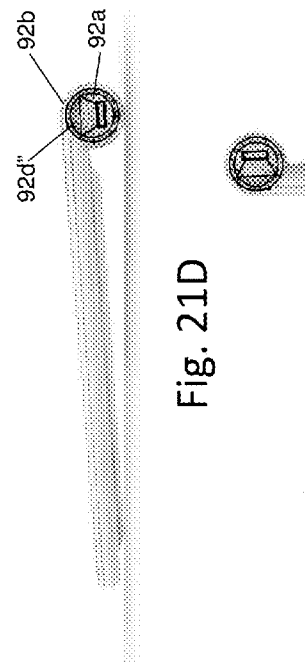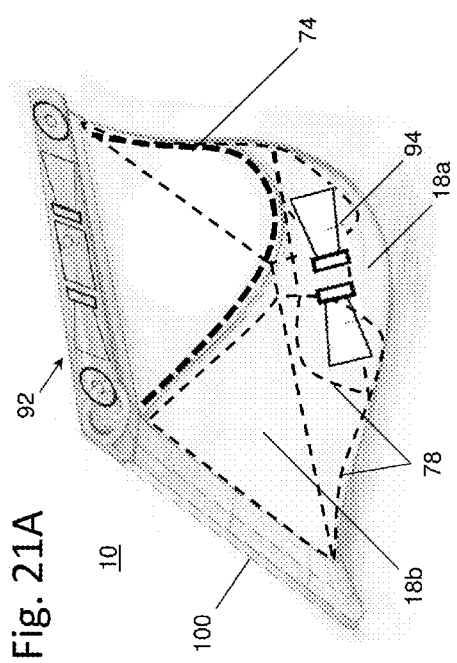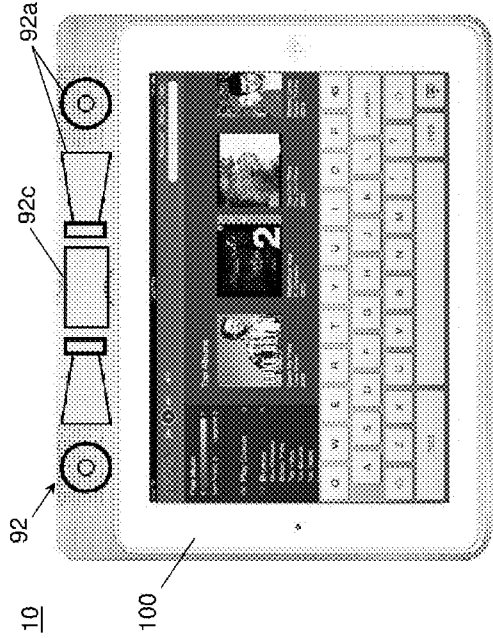
Fig. 21A
Fig. 21B
Fig. 21C
Fig. 21D
Fig. 21E

CONFORMABLE COMPUTER HOLDER

CROSS-REFERENCE TO RELATED APPLICATIONS

This application claims priority from U.S. Provisional Patent Application No. 61/885,120 filed on Oct. 1, 2013 and from U.S. patent application Ser. No. 13/109,341 filed on May 17, 2011, U.S. Pat. No. 8,757,374, which claims priority to U.S. Provisional Patent Application No. 61/345,247 filed May 17, 2010, all of which are incorporated by reference herein.

STATEMENT REGARDING FEDERALLY SPONSORED RESEARCH

Not Applicable.

APPENDIX

Not Applicable.

BACKGROUND OF THE INVENTION

1. Field of the Invention

The present invention relates to a computer holder, and more particularly to a conformable computer holder that steadies the computer on any surface that is flat or irregularly shaped and which has adjustability in multiple directions.

2. Related Art

Lap desks are known. For example, a portable desk is disclosed in U.S. Pat. No. 4,052,944. The lower portion of the desk is a pillow-like portion of flexible material which forms a yieldable container which is partially filled with a dry, flowable material, such as expanded STYROFOAM beads, particles or similar materials. The casing portion is secured at the top to a piece of sub-covering which is secured to a hard material by adhesive, glue or other similar attachments. The beads can shift to allow the pillow-like portion to adjust to the contour of the surface on which it is to be used. An upstanding abutment secured along one side of the desk top forms a stop for books, pencils and similar items to rest against.

As computers have become smaller and portable, such desks have been used to support such computers. For example, U.S. Pat. No. 5,623,869 discloses a lap table for a portable computer. The lap table has a supple main body with top surface joined to a bottom surface and a sealed hollow interior for containing a filling material which gives the main body a degree of rigidity that is sufficient to support the portable computer. The filling material may be either an inflating gas or beads. The lap table has a wall on the top surface that secures the portable computer to the top surface. However, the base portion of these lap table designs usually flare outwardly, with the sides of the base being in a diverging configuration, to keep the table top horizontal or are otherwise configured to keep the table relatively flat to the horizontal plane or generally parallel to the surface on which the table is resting.

Other types of stands are typically used to hold laptop computers at an angle to the user. Typically, these stands are designed to be placed on a firm horizontal surface, such as a table and so they either have a rigid base rather than a pillow-like or supple base, such as the stand described in the patent application published as US Pub. No. 2009/0179132, or the base portion of the stands maintains the same relative platform shape as the surface on which the computer rests or is held in place, or flares out from the sides as discussed above, such as the stands described in the patent application published as US Pub. No. 2005/0072893.

There have also been computer carrying bags that have been designed particularly for use with tablet computers that have touch sensitive screens. Some of these carrying bags have been designed to allow a user to operate the computer while the computer is connected to the bag, and at least one bag as shown in U.S. Pat. No. 5,887,777 even allows an operator to adjust the tilt angle of the computer at different orientations relative to a base surface while the computer is connected to the bag. However, traditional carrying bags are designed like traditional rectangular brief cases in which the computer is held by the bag with its screen in a vertical orientation when the bag is sitting upwardly on a surface, and when the bag is laid down, the screen is arranged at a horizontal orientation relative to the surface. Accordingly, in order to achieve different tilt angles, these traditional computer carrying bags typically require an arrangement of panels or other external framework that extend from the outer surface of the compartment portion of the bag to serve as a stand for both the bag and the computer. For example, the '777 Patent referenced above uses external semi-rigid panels covered by a flexible material so that the panels can be connected and folded relative to each other to prop up the carrying bag and vary the tilt of the computer and the bag.

SUMMARY OF THE INVENTION

The present invention is for a holder that is used to steady a computer on a supporting surface, where the computer has a front screen side, a back housing side and peripheral sides. The holder has a case and a conformable backing connected to the case. The holder has an attachment portion that is connected to the computer and is configured as a shell to the computer housing. The pair of longitudinal sides having a length size and a pair of lateral sides have a width size.

The conformable backing extends from the longitudinal and lateral sides away from the computer housing to a distal end which is spaced from said case and is inward from the sides. When the case is positioned at an angle, the distal end is at a distance that is further from the case than when than when the case is in a flat position. The spaced distal end has a maximum distance greater than one half of the shell width size and a minimum distance adjacent to the case.

The conformable backing has a membrane that can be partially filled with conformable solids, a low viscosity liquid, or a gas, or that has a number of foldable bellows that is at least partially filled with a gas.

The conformable backing can serve as a carrying bag that has an interior compartment that is used for storing objects. The conformable backing may also include closure for securing the opening of the storage area, such as a zipper or other fastening mechanism.

The case can include a speaker tube or bar affixed or otherwise attached along an edge of the case to playing audio from the computer. The speaker bar may also include one or more bass-augmenting vent openings along its length, at the ends of the speaker bar, or both. Optionally, a subwoofer speaker in communication with the speaker bar may be positioned within the conformable backing for augmenting the user's audio experience when using the speaker bar to play audio from the computer. Furthermore, the speaker tube may advantageously act as a handle for the holder, allowing the user to easily carry or otherwise transport the holder from one location/position to the next.

In yet another embodiment, the case may also have a sound reflector disposed in the top surface of the case. For example, the case may have an open space with a curved wall along a side edge of the case that permits sound to be reflected towards the front side of the computer, e.g., towards the user and enhancing the sound quality directed toward the operator of the computer.

Further areas of applicability of the present invention will become apparent from the detailed description provided hereinafter. The detailed description and specific examples explain the various features and several aspects of the invention and are intended for purposes of illustration only and are not intended to limit the scope of the invention.

BRIEF DESCRIPTION OF THE DRAWINGS

The present invention will become more fully understood from the detailed description and the accompanying drawings, wherein:

FIGS. 1A-1H are side views of the computer holder in various positions with a conformable backing in corresponding arrangements.

FIG. 2 is a cross-sectional end view of the computer holder in FIG. 1A with a case removably attached to the conformable backing with an outer membrane and an inner bladder.

FIG. 2A is a cross-sectional view of a snap-on attachment at a peripheral end of the computer holder in FIG. 2.

FIG. 3 is a cross-sectional end view of the computer holder in FIG. 1A with a case integrally formed with the conformable backing with the outer membrane and inner bladder.

FIG. 3A is a cross-sectional view of a sewn attachment at a peripheral end of the computer holder in FIG. 3.

FIGS. 4A and 4B are cross-sectional end views of the case integrally formed with the membrane having a valve.

FIG. 5 is a cross-sectional end view of the computer holder in FIG. 1A with the case removably attached to a lower aspect ratio membrane without any inner bladder.

FIG. 5A is a cross-sectional view of a hook and loop attachment at a peripheral end of the computer holder in FIG. 5.

FIG. 6 is a cross-sectional end view of the computer holder in FIG. 1A with the case removably attached to the membrane without any inner bladder.

FIG. 7A is a cross-sectional end view of the computer holder in FIG. 1A with a protective case.

FIG. 7B is a cross-sectional end view of the computer holder in FIG. 1A with the protective case and a conformable backing and FIG. 7C is a detail view of FIG. 7B illustrating clips for attachment to the case.

FIGS. 8 and 9 are cross-sectional end views of the computer holder in FIG. 1A with magnets in the protective case and the conformable backing.

FIGS. 10A and 10B are alternative exploded views of the computer holder in FIG. 1A.

FIGS. 11A-11F are alternative views of the computer holder in FIG. 1A.

FIGS. 12A-12F are views of an alternative embodiment of the computer holder according to the present invention.

FIGS. 13A-13E are views of the computer holder in FIG. 1A with carrying straps and a pocket and serving as a carrying bag.

FIGS. 14A-14G are views of the computer holder in FIG. 1A with a carrying strap and a cover.

FIGS. 15A and 15B are back perspective view of a computer carrying bag holder with a compartment and closures and carrying strap, and FIG. 15C is a front perspective view of the carrying bag shown in FIG. 15B with a cover having a keyboard.

FIGS. 16A-16J are views of alternative arrangements of a computer carrying bag holder with a half-barrel style compartment.

FIGS. 17A-17E are views of alternative arrangements of a computer carrying bag holder with a soft-sided compartment.

FIGS. 18A-18E are views of an envelope-style computer carrying bag holder.

FIGS. 19A-19C are views of an accordion-style computer carrying bag holder.

FIGS. 20A-20C are views of a prism-style computer carrying bag holder.

FIGS. 21A-21E are views of a computer holder with a case that has speakers in a sound tube.

DETAILED DESCRIPTION OF THE PREFERRED EMBODIMENTS

Figure 22A:
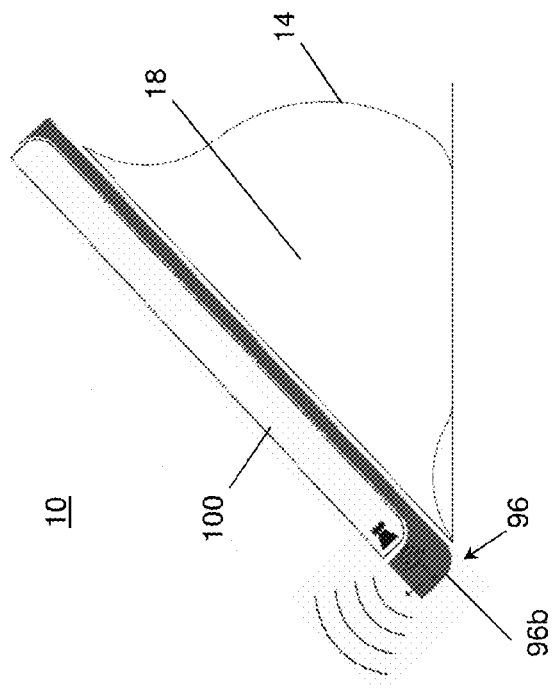
FIGS. 22A-22C are views of a computer holder with a case that has a channel with a curved surface spaced from the computer for reflecting sound from a computer.

The following description of the preferred embodiment(s) is merely exemplary in nature and is in no way intended to limit the invention, its application, or uses.

As illustrated in FIG. 1, the computer holder 10 is used for steadying a computer 100 on a supporting surface 110 which may be flat 110a or irregular 110b. The computer has a front screen side 102, a back housing side 104 and peripheral sides 106a, 106b. As illustrated in the drawings, the present invention is shown in combination with a tablet computer 100. It will be appreciated that the holder 10 described by the present invention can also be adapted for use as a laptop computer cushion as well as other applications where flexible positioning and adjustment for improved viewing angle of various devices is needed, especially interactive devices in which the holder frees the user's hands to manipulate, operate or otherwise interact with the devices' interfaces.

The holder 10 of the present invention has two primary components, a protective case 12 and the conformable backing 14 which is attached to the case. The case 12 holds the computer tablet 100 and is preferably made of injection molded plastic, injection molded silicone, various types of metal or similar rigid or semi-rigid materials. The backing can be formed as a soft membrane 48 as illustrated in FIGS. 1A-1E and FIGS. 2-11 or as an accordion-like bellows 50d as illustrated in FIGS. 1F and 1G and FIG. 12. The backing 14 is preferably made of a sewn fabric, leather and other similar soft materials, and may alternatively be made of injection molded silicone, and the fabric can also be stretchable. The space within the backing can be filled with small filling materials 50a, a low viscosity fluid 50b or filled with a gas 50c such as air. The small filling materials 50a can be any number of conforming solid materials, such as plastic balls, buckwheat, beans, and/or any other loose filling materials. As discussed with reference to FIG. 4A below, a two way valve 56 can be attached to the backing 14 to allow a controlled flow 62a and capture of the gas, particularly the introduction, containment and evacuation of air. Also, as explained below with regard to FIGS. 13 and 14, the computer holder 10 may also serve as a carrying bag with a carrying handle or strap 16 attached to the case 12 and one or more pockets 18 or other compartments formed in the conformable backing 14 and may also include a cover 20 that can cover the conformable backing as well as the computer screen 102.

The case 12 has an attachment portion that is connected to the computer 100 and is configured as a shell 22a to the computer housing 104 or may be a mounting plate 22b or frame for a universal connector 82 that is connected to the computer housing 104. As particularly shown in FIGS. 11A, 11B and 11C, the shell's sides 24a, 24b have a length size 26a and a width size 26b that correspond with the size of the computer being held. As discussed in detail below, the case 12 can adhere or attach to the back of the computer 100 in a number of different ways. The shell 22a can correspond with the fittings for all tablet computers on the market and is easily adaptable with any fittings that may be incorporated into future computers. The backing 14 is conformable because it is designed to conform to different surfaces, taking on different shapes when the holder 12 is being used. The backing can return to its inherent shape when not conforming to some irregularly shaped supporting surface or is otherwise not being used to prop up or tilt the computer screen from a supporting surface.

The conformable backing 14 can be removably attached to the case 12 as shown in FIG. 2 or can be permanently connected to the case 12 as shown in FIG. 3. Regardless of the attachment between the conformable backing and the case, the backing extends from more than one of the case sides 24 away from the computer housing 104 to a distal end 34 that is spaced from the case at a desired distance 28a when the case is in an extended position 30a and a shorter distance 28b when the case is in a flattened position 30b. The conformable backing sides 14a, 14b, 14c, 14d are disposed in a converging arrangement 70 relative to each other toward a distal point 72 that is beyond the distal end 34. According to one aspect of the present invention for the various embodiments of the present invention, the backing's lateral sides 14a, 14b and the backing's longitudinal sides 14c, 14d angle inwardly in this converging arrangement.

As illustrated in FIG. 13, the holder 10 can also include a strap 16 connected to the case 12 or it can have a pocket 18 or other compartment located between the case 12 and the conformable backing 14. The attachable strap can vary in length and when combined with pockets and the cover 20 shown in FIG. 14, the computer holder 12 can serve as a carrying bag with fashionable looks. The strap 16 and pocket 18 provide secondary functionality for the holder 10 to serve as a woman's purse or a man's bag. The pocket may hold credit cards, money and other personal effects and items and may include a closure 74 to keep the contents of the compartment or other pockets 18 from falling out, particularly when the conformable backing side of the bag is placed on a surface while the operator uses the computer. The closure can be a zipper, hook and loop fastener, or any other closure means. A zipper closure 74a around the compartment's opening 18' is shown in FIG. 15A, and a snap clasp closure 74b is shown in FIG. 15B. Other carrying bag designs may have alternative closure mechanisms, such as magnetic closures, latches and kissing locks 74c as shown in FIG. 16. Any other closures that are now known, such as hook and loop fasteners, or may be developed in the future can be used with the bag designs without departing from the scope of the present invention. The straps are releasably attachable to the bezels at the top of the bag, from the side of the case or both.

The cover 20 is also functional, serving to protect the computer's screen 102 and the conformable backing 14. The cover 20 is connected to the case 12 and has a folded position 32a with one section 20a covering the screen 102 and may include another section 20b that extends past the screen to cover at least a portion of the conformable backing 14. As shown in FIG. 16, the extended section 20b of the cover may be a short flap. To use the computer, the cover 20 is moved to its unfolded position 32b uncovering the screen and the conformable backing. In addition to protecting the computer's screen, the cover 20 may include a keyboard 76, such as shown in FIG. 15C.

As particularly shown in FIGS. 10 and 11, the case sides preferably include at least one longitudinal side 24a and a pair of lateral sides 24b forming the shell 22. The case 12 is substantially adjacent to the computer housing 104 and the shell 22 is proximate to the periphery 106 of the computer housing. The shell 22 extends across at least a portion of the computer housing and a plurality access ports 40a, 40b corresponding with utility ports 42a and interface ports 42b on the computer. With the width size of the shell's sides 26b defined and particularly shown in FIGS. 4A and 12A, it will be appreciated that the spaced distal end 34 of the conformal backing 14 has a maximum distance 36a approximately equal to or greater than one half of the shell width size. Also, with reference to FIGS. 4B and 12D, the spaced distal end 34 has a minimum distance 36b adjacent to the case 12.

As particularly shown in the various illustrations, particularly the detail drawings, there are a number of alternative attachment devices 44 that can be used to removably affix the case 12 to the computer 100, i.e., releasably attach or connect the computer to the case. Examples of currently known case attachments include magnetic attachments 44a, clip-on attachments 44b, slide-on attachments 44c, snap-on attachments 44d, and hook and loop attachments. It will be appreciated that any releasable fasteners 44 or other attachment means that are now known or developed in the future can be incorporated into the case attachment portion without departing from the scope of the present invention. As shown in FIG. 11E, the case 12 can also hold the computer 100 at the corresponding corners 108 of the respective sides 106a, 106b. This releasable attachment at the corners can be a flexible fabric or elastic straps 44e that extend from the sides of the case 12 over the corners of the computer.

As shown in FIGS. 10B, 11F and 16J, the mounting plate 22b can be releasably connected to a universal connector 82 which can be attached to the back of any computer 100, including a tablet computer or a smart-phone. The universal connector provides a quick-release functionality, and since it attaches only to the back of the computer and is not dependent on the exact side length dimensions of the computer, the universal connector can be used for most laptop computers, tablet computers and even smart-phones. A back plate 84a that adheres to the back of the tablet computer 100 can be used as a universal connector. On one side, the back plate 84a would have an adhesive film 84b that may have reusable stick-on properties that adheres the back plate to the back of the computer. On the other side, the back plate would have magnets 84c that releasably mate with and connect to corresponding magnets 86 that are fixedly attached to the mounting plate 22b which is fixedly attached to the conformable backing 14. It will be appreciated that the back plate 84a can be releasably connected to the back of the computer by a number of releasable fasteners, such as magnets, suction cups, elastic straps, and hook and loop fasteners. Similarly, the back plate can be connected to the mounting plate by similar releasable fasteners. It may also be possible to apply the fasteners directly to the back of the computer without the intermediate back plate.

The case 12 securely holds the computer tablet 100 by its sides, corners and/or back exposing the screen and control buttons on the side of the computer tablet to allow for easy control. The backing 14 snaps or slides onto the case and securely connects the backing with the case 12. The filled backing allows the operator of the computer to position the assembly on most surfaces, such as the operator's lap or leg or on a table top, or even uneven surfaces, allowing the device to be positioned in various viewing angles for a more ergonomic and comfortable interaction with the computer tablet.

The conformable backing 14 can be fixedly connected to the case 12 through a permanent fixation 38, such as an integral formation 38a, a sewn attachment 38b, and a glued attachment 38c. Alternatively, the conformable backing can be connected to the case 12 through a removable attachment 46. Examples of removable attachment devices include magnetic attachments 46a, clip-on attachments 46b, slide-on attachments 46c, snap-on attachments 46d, hook and loop attachments 46e, and a frame 46f. It will be appreciated that these examples are not an exhaustive list of connection hardware and fasteners that could be used for the permanent fixations 38 and the removable attachments 46; accordingly any other connection means or fasteners that are now known or developed in the future can be incorporated into the holder's permanent fixations 38 and the removable attachments 46 without departing from the scope of the present invention.

As indicated above, the conformable backing 14 has a membrane 48 that can be partially filled with conformable solids 50a, a low viscosity liquid 50b, or a gas 50c, or that has a number of foldable bellows 50d that is at least partially filled with a gas. It will be appreciated that when the bellows is in their fully extended position, the volume of air inside the bellows membrane is significantly greater than when the bellows are in their fully retracted position. In the embodiments shown in FIGS. 2, 3, 7, 9, 10 and 13, the conformable backing 14 has an outer membrane 52 and an inner bladder 54 within the outer membrane. The bladder is partially filled with at least one of the conformable solids, the low viscosity liquid and the gas.

The conformable backing 14 may also include a valve 56, a cap 58 and/or a handle 60. As shown in FIG. 4A, the valve 56 provides a sealable pathway 62a into the conformable backing 14 for the gas 50c to be introduced into and evacuated from the conformable backing. The two-way valve 56 can be used in combination with a separate or integral pump (not shown) to rapidly inflate or deflate the membrane 48 or an inner bladder 54 which may alternatively contain the valve. Similarly, as shown in FIG. 4B, the cap 58 provides another sealable pathway 62b into the conformable backing 14 for the liquid and/or the conformable solids to be introduced into and removed from the conformable backing 14. The handle 60 provides a mechanical advantage for adjusting the conformable backing 14. As discussed above, the gas, liquid, solids and bellows can be manipulated to adjust the maximum distance 36a of the distal end 34 away from the case 12. Also the gas, liquid, and solids can be substantially removed from the conformable backing 14 or the bellows can be folded in to produce a minimum distance 36b in which the distal end 34 is adjacent to the case 12.

As particularly illustrated in FIGS. 1A-1G, the conformable backing 14 has a several arrangements 64a, 64b, 64c, 64d, 64e, 64f, 64g, 64h according to the respective positions of the case 12 and the supporting surface 110 that is in contact with the conformable backing. As indicated by these illustrations, the positions can be flat, horizontally elevated on the longitudinal side 24a, vertically elevated on the lateral side 24b, and diagonally elevated between the longitudinal and vertical sides as shown in FIG. 1H. It will be appreciated that the soft conformable backing 14 has a center-weighted center of gravity (CG) 66 for great balance and provides a fulcrum 68 for which to tilt and move the computer when playing games or otherwise interacting with the computer. It will also be appreciated that the holder 10 of the present invention automatically conforms to uneven surfaces and provides for a center of gravity 66 within the conformable backing 14 and proximate to the fulcrum 68 so that the holder 10 is very stable, even on irregular surfaces 110b or when the holder 10 is securing and stabilizing a computer 100 for a user who is travelling in a moving vehicle, such as an automobile, a boat, a plane or a train.

With regard to the bellows embodiment illustrated in FIGS. 1F, 1G, and 12A-12E, the accordion-like conformable backing is preferably formed from an injection mold using silicon materials. As with the conformable sides 14a, 14b, 14c, 14d of the soft membrane 48, the bellows 50d are preferably angled such that the conformable sides of the bellows are in a converging configuration 70 toward a distal point 72 beyond the distal end 34 and the sides collapse into themselves for compactness. Also, the bellows preferably contain venting holes which permit air to be released as the bellows are pushed inward and allow air to flow into the bladder when the bellows are pulled outward. When the bellows are pulled out into their fully extended position, the bellows back provides vertical and horizontal upright viewing angles for the tablet computer. When the bellows are partially opened, such as when one side is fully or partly closed and particularly illustrated in FIG. 1G, the accordion-like back leans at multiple comfortable typing and reading angles both horizontally and vertically on a flat surface as well as on uneven surfaces.

With regard to the embodiments of the computer carrying bag holders 10 illustrated in FIG. 15, the conformable backing 14 includes a compartment space 18 between the conformable sides and the case for storage of personal objects 112 and also includes a strap 16 for carrying the computer holder. As with the embodiments described above, the converging conformable backing with the compartment continues to provide a fulcrum for the operator to view and use the tablet and to adjust the tilt angle of the case about the fulcrum. The conformable backing may be constructed of a semi-rigid material that substantially holds the shape of the conformable backing, thereby permitting the interior storage space of the conformable backing to extend for nearly the entire volume between the interior of the conformable sides and the case, as illustrated in FIG. 15. In other embodiments, the pocket 18 can situated near the case, and the conformable backing can include fill material 50 for maintaining the shape of the backing, as illustrated in FIGS. 13C-13E. As shown in FIG. 10B, the fill material 50 may be contained in a region proximate to the conformable sides by a bladder 54 that is spaced from the conformable sides.

The conformable backing 14 may also have an internal framework 78 which helps support the case at an acute angle (a) relative to the surface according to the converging arrangement of the conformable backing while also permitting the converging conformable sides between the framework to conform to the surface on which the carrying bag holder 10 rests. Examples of various internal frameworks are shown in FIGS. 15A, 15B and 21B. Additionally, the use of fill material 50 within the conformable backing and in a bladder 54, such as shown and described with reference to FIGS. 10A and 10B, is also a type of internal framework. As described above, the converging conformable backing with the internal framework provides a fulcrum for the operator to view and use the tablet and to adjust the tilt of the case from one acute angle (α) to another acute angle (α').

Another aspect of the invention is shown in FIGS. 16H and 16J. As shown in FIG. 16J, the converging conformable backing 14 supports the case 12 and the computer 100 in a landscape orientation at one acute angle (a) relative to the surface 110 when one of the conformable sides that extends from a longitudinal side of the case is resting on the surface. Similarly, as shown in FIG. 16H, the converging conformable backing 14 supports the case 12 and computer 100 in a portrait orientation at a second acute angle (α") relative to the surface 100 when one of the conformable sides that extends from a lateral side of the case is resting on the surface. FIGS. 16A-16J are views of several arrangements of a computer carrying bag holder with a half-barrel style compartment; generally, when the carrying bag holder is placed on a surface, flat or uneven, on any of its sides, the bag with the computer leans and the soft side portions, or semi-rigid sides, bend to adapt and conform to the flat surface. When personal objects are placed in the compartment, the converging shapes of the back sides bias the objects toward the case and helps center the contents to provide a center of gravity as ballast 88 to the backing which improves the stability and control of the tablet while in use.

The aspect of the invention described above with regard to the half-barrel style compartment, particularly including FIGS. 16H and 16J, are also applicable to the different styles of compartments which have a converging conformable backing. Additionally, it will also be appreciated that this aspect of the invention can also be applied to computer carrying bag holders 10 with a converging backing which have semi-rigid converging sides or otherwise have non-conformable converging sides. Also, as shown in FIG. 16D, the conformable backing may be connected to the case through gussets 80a which permit the backing to expand when the compartment is opened. As shown in FIG. 16G, the sides of the conformable backing may also have gussets to allow for an expansion in the storage space in the compartment.

As shown in FIGS. 15C, 16I and 17A, the portion of the case which releasably holds the computer against the mounting plate may be a bezel frame 90. The bezel frame has a quick-release functionality. By using snap clasps, magnets, or kissing locks in the bezel, the computer can drop in and pulls out quickly and firmly.

FIGS. 17A-17E are views of alternative arrangements of a computer carrying bag holder with a soft-sided backing, and FIGS. 18A-18E are views of an envelope-style computer carrying bag holder. The soft-sided backing and envelope-style backing also have a converging arrangement of the sides. Accordingly, these embodiments also provide a fulcrum that allows the operator to adjust the case and computer to various angles for viewing when the holder rests on a flat surface or an uneven surface, such as a desktop or a person's lap, respectively. The envelope-style version can be collapsible so that when the compartment is empty, the envelope-style backing flattens out to form a slimmer profile as shown in FIG. 18B and when the compartment contains objects, the envelope-style backing extends outwardly as shown in FIG. 18C. As with the other holder embodiments that also have a compartment, these backings also have an opening in one of the sides that gives access to the space inside the conformable backing for the storage of objects. The varying degrees of pliability of the bag material provide a conforming utility that allows the bag back to adapt and balance on multiple surfaces. When objects are placed in the storage space, the shape directs the contents to provide a center of gravity to help stabilize the computer as a ballast for the backing. When the storage space is not used the lounge bag back still provides a shape that angles and conforms to varying degrees. A double-hinged bezel frame with a kissing lock is shown in FIGS. 17C-17E.

FIGS. 19A-19C are views of an accordion-style computer carrying bag holder, and FIGS. 20A-20C are views of a prism-style computer carrying bag holder. The multiple bellows of the accordion-style holder provide a range of angles for a tablet computer to be viewed while it rests on a supporting surface. The accordion-style holder can be tilted while it is in a landscape orientation or in a portrait orientation. The material can be leather, silicone or various other kinds of material. The prism-style holder may also provide a range of tilt angles as with the accordion-style holder, and the holders can be viewed in a landscape orientation or in a portrait orientation. Also, as shown in FIG. 20C, the angle (α) at which one side of the backing extends from the case is greater than the other angle (α') which allows the screen to be viewed at different angles depending on the side which rests on the supporting surface.

With regard to the embodiment illustrated in FIGS. 21A-21E, the computer holder 10 includes a sound tube or bar 92 in which one or more speakers 92a are attached to or otherwise disposed within a tube 92b that is formed along an edge of the computer holder 10. For example, FIG. 21B illustrates a sound tube disposed along the top edge of the computer holder with the conformable backing. FIGS. 21D and 21E illustrate side views of a computer holder without the conformable backing attached. As shown in FIG. 21D, the computer holder has the conformable backing removed, and the sound tube can tilt the computer screen at an acute angle relative to the surface on which the computer rests which provides a more ergonomic position for the operator to type on the computer's keyboard. The speaker tube may optionally function as a handle for the computer holder, as illustrated in FIG. 21E. The speaker tube computer holder can also be used with any of the various carrying bag designs described above.

As shown in FIGS. 21A-21C, the sound tube includes mid-range tweeter speakers 92a' and woofer speakers 92a", a rechargeable battery 92c power supply, and sound vents 92d', 92d" on the face and sides of the sound tube. The sound vents at the sides of the sound tube augment or amplify the bass produced by the speakers. As shown in FIG. 21B, a subwoofer 94, may also be positioned within the conformable backing for delivering low-end sound waves and vibrations to the user. When the computer holder with the conformable backing is resting on the user's legs, this advantageously creates a more immersive auditory experience for the user. Also as shown in FIG. 21B, multiple compartments 18a, 18b may be formed within the conformable backing. The subwoofer speaker is contained within one of the compartments 18a and the personal objects are held in another compartment 18b. It will also be appreciated that filling material could be included in yet another compartment as shown in FIGS. 10A and 10B.

Figure 22B:
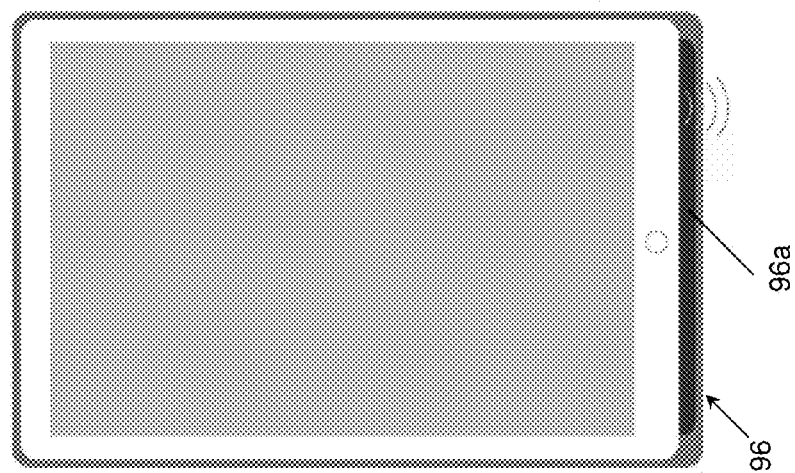
Figure 22C:
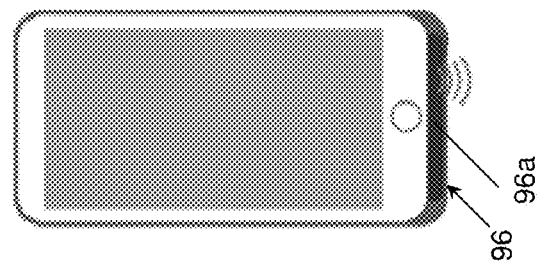

With regard to the embodiment illustrated in FIGS. 22A-22C, the computer holder includes a sound reflector 96 at a periphery of the case to reflect sound coming from the speakers within the computer case or smart-phone towards the front of the device, i.e., toward the operator. For example, the sound reflector may include an open area, such as an elongated channel 96a with a curved wall 96b extending along a side edge of the case and spaced a distance from one of the peripheral sides of the computer that is held in the case. The sound reflector may passively amplify the reflected sound without the need for powered amplification. For example, the sound reflector may be formed with a wall that is shaped with a parabolic contour to redirect the sound from the computer speaker to the front of the computer. The sound reflector can be used apart from any conformable backing or as illustrated in FIG. 22C, the sound reflector may be combined with the conformable backing of the present invention. Additionally, it will be recognized that the sound reflector computer holder may also be used with any of the various carrying bag designs.

One of ordinary skill in the art will further appreciate that the holder is operative for use with other computing devices, such as controllers and remote control devices and other electronic devices that have a keypad or screen. By way of example and not limitation, the holder may support devices such as gaming controllers, home theater audio/visual controllers and remote control devices, home automation controllers, etc. Aspects of the present invention advantageously permit the user to adjust the position of the holder to best suit the item or device being place upon it, as described below.

Method for Adjusting Computer Holder

To adjust a computer holder 10 according to the present invention, the user would slide or snap their computer tablet 100 into/onto the holder and rest it on their lap, on a flat surface such as a table top, or on some irregular surface such as the ground.

With the computer 100 in the holder 10, the conformable backing 14 reduces pressure points and insulates the user from the computer's heat when the computer is supported by the user's body. Also, the holder 10 can keep the computer 100 upright on a desktop or on an uneven surface. With the conformable backing, the screen 102 can be adjusted in multiple directions, horizontally, vertically or even diagonally.

The basic elements of the holder 10 are described above. The conformable case 12 and conformable backing 14 are attached to the computer 100. The conformable backing extends from more than one of the peripheral sides away from the computer housing to a distal end 34. The conformable backing has a membrane configured to contain materials or foldable bellows 50d. The materials can be conformable solids, a low viscosity liquid, a gas, and any combination thereof. The conformable backing also has a valve, a cap or a handle. The valve provides a sealable pathway into the conformable backing for the gas to be introduced into and evacuated from the conformable backing. The cap provides another sealable pathway into the conformable backing for the liquid or the conformable solids to be introduced into and removed from the conformable backing. The handle provides a mechanical advantage for adjusting the conformable backing. The distal end is spaced from the case at a first distance 28a when the conformable backing is in an extended position and a second distance 28b less than the first distance when the case is in a flattened position.

An amount of the materials is adjusted within the conformable backing. The adjusted amount varies the longer distance according to the volume of the materials. Specifically, the adjusted amount reduces the longer distance to be substantially contiguous with the computer housing when the volume of the materials is a substantially eliminated.

The embodiments were chosen and described to best explain the principles of the invention and its practical application to persons who are skilled in the art. As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. For example, it will be appreciated that the holder 10 of the present invention not only can be made as an all-in-one product with the conformable backing 14 fixedly attached to the tablet holder's hard case 12, but the holder 12 can be produced with a variety of alternative attachment options. As discussed above, the holder can have a hard protective case 12 with a removable conformable backing 14 that allows the hard protective case 12 stay on the tablet computer 100 when the conformable backing 14 is removed. The removable conformable backing 14 can be a quick-release bag that is attached using magnets, snaps or other quick-release fasteners. Thus, the breadth and scope of the present invention should not be limited by any of the above-described exemplary embodiments, but should be defined only in accordance with the following claims appended hereto and their equivalents.

What is claimed is:

1. A carrying bag holder for storing a computer and personal objects and supporting the computer on a surface while being operated, the computer having a front screen side, a back housing side and peripheral sides and corresponding corners, comprising:
    a case with an attachment portion connected to the computer, wherein said case has a pair of longitudinal sides and a pair of lateral sides;
    a conformable backing connected to said case, wherein said conformable backing extends from said longitudinal sides and from said lateral sides to a distal end away from the case in a converging arrangement, wherein said conformable backing comprises a center of gravity between said distal end and said case, and wherein said conformable backing is comprised of a plurality of conformable sides in said converging arrangement, said plurality of conformable sides comprising an upper side and a lower side extending from said longitudinal sides of said case and further comprising a pair of opposing sides extending from said lateral sides of said case and connected to said upper side and said lower side; and
    a pocket formed in said conformable backing, wherein said pocket holds the personal objects within said conformable backing, wherein an opening to said pocket is formed in said upper side of said conformable backing, wherein said lower side of said conformable backing rests on the surface, and wherein said opposing sides support said attachment portion of said case and the compute acute angle relative to the surface.

2. The carrying bag holder of claim 1, wherein said case is configured as at least one of a shell and a mounting plate, wherein said distal end of said conformable backing is positioned away from said attachment portion of said case at a maximum distance greater than one half a length of said lateral sides of said case, said maximum distance measured perpendicularly from said attachment portion, and wherein said pocket is configured as a compartment between said case and said conformable backing.

3. The carrying bag holder of claim 2, wherein said shell releasably holds the computer by the peripheral sides or by the corresponding corners and wherein said mounting plate holds the computer by a back plate fastened to the back housing of the computer.

4. The carrying bag holder of claim 2, further comprising a carrying handle and a cover, wherein said carrying handle is attached to at least one of said case and said conformable backing, wherein said cover is connected to at least one of said case and said conformable backing and extends over the computer, and wherein said compartment is further comprised of a closure attached to at least one of said conformable sides proximate to said opening in said compartment.

5. The carrying bag holder of claim 1, further comprising a gusset between said case and said conformable sides in said conformable backing.

6. The carrying bag holder of claim 1, further comprising a ballast in said compartment providing a fulcrum for the conformable backing on the surface, wherein said conformable sides hold said ballast in said compartment with a bias toward said case.

7. The carrying bag holder of claim 6, wherein said ballast is selected from the group consisting of a filling material in an inner bladder, a subwoofer speaker, the personal objects, and any combination thereof.

8. The carrying bag holder of claim 7, wherein said inner bladder is contained in a separate compartment extending around a periphery of said conformable backing.

9. The carrying bag holder of claim 1, further comprising a plurality of compartments, wherein at least one of a filling material and a subwoofer speaker is contained within a first compartment and the personal objects are held in a second compartment.

10. The carrying bag holder of claim 1, further comprising an internal framework within said conformable backing, wherein said internal framework further supports said conformable sides in supporting said case and the computer at said acute angle relative to the surface.

11. The carrying bag holder of claim 1, wherein said opening to said pocket in said upper side of said conformable backing faces away from said lower side of said conformable backing and faces away from the surface when said lower side rests on the surface, and wherein said pocket is accessible while said lower side rests on the surface and while said attachment portion is connected to the computer.

12. The carrying bag holder of claim 1, wherein one of said conformable sides extending inwardly in said converging arrangement from one of said longitudinal sides of said case rests on the surface, and wherein said conformable sides extending from said lateral sides of said case support said case and the computer in a landscape orientation at a first acute angle relative to the surface.

13. The carrying bag holder of claim 12, wherein one of said conformable sides extending inwardly in said converging arrangement from one of said lateral sides of said case rests on the surface, and wherein said conformable sides extending from said longitudinal sides of said case support said case and the computer in a portrait orientation at a second acute angle relative to the surface.

14. The carrying bag holder of claim 1, further comprising a speaker tube formed at a periphery of said case, wherein said speaker tube is comprised of at least one speaker within a cylindrical housing.

15. The carrying bag holder of claim 1, further comprising a sound reflector extending from a periphery of said case along at least one of said longitudinal sides or one of said lateral sides, wherein said sound reflector is comprised of an elongated channel having a curved wall spaced from one of the peripheral sides of the computer held in said case.

16. A carrying bag holder for storing a computer and personal objects and supporting the computer on a surface while being operated, comprising:
  a case with an attachment portion connected to the computer, wherein said case has a pair of longitudinal sides and a pair of lateral sides;
  a backing connected to said case, wherein said backing extends from said longitudinal sides and from said lateral sides to a distal end away from the case in a converging arrangement, wherein said backing comprises a center of gravity between said distal end and said case, wherein said backing is comprised of a plurality of sides in said converging arrangement, wherein at least one of said sides rests on the surface and other ones of said sides support said case and the computer at an acute angle relative to the surface; and
  a compartment formed in said backing, wherein said compartment comprises an opening in at least one of said sides and further comprises a closure attached to one of said sides proximate to said opening, wherein said compartment holds the personal objects within said backing.

17. The carrying bag holder of claim 16, wherein at least said side resting on the surface is conformable and provides a fulcrum proximate to the surface, wherein said fulcrum and said sides in said converging arrangement provide an adjustable tilt to said acute angle, wherein said side with said opening is an upper side, wherein said side resting on the surface is a lower side facing away from said upper side, and wherein said upper side and said opening face away from the surface when said lower side is resting on the surface.

18. The carrying bag holder of claim 16, wherein said distal end of said backing is positioned away from said attachment portion of said case at a maximum distance greater than one half a length of said lateral sides of said case, said maximum distance measured from said attachment portion through said compartment, wherein all of said sides are conformable, wherein said converging conformable sides support said case and the computer in a landscape orientation at a first acute angle relative to the surface when one of said conformable sides extending from said longitudinal sides of said case is resting on the surface, and wherein said converging conformable sides support said case and the computer in a portrait orientation at a second acute angle relative to the surface when one of said conformable sides extending from said lateral sides of said case is resting on the surface.

19. A carrying bag holder for storing a computer and personal objects and supporting the computer on a surface while being operated, the computer having a front screen side, a back housing side and peripheral sides and corresponding corners, comprising:
  a case with an attachment portion releasably connected to the computer, wherein said case has a pair of longitudinal sides and a pair of lateral sides;
  a conformable backing fixedly connected to said case, wherein said conformable backing extends from said longitudinal sides and from said lateral sides to a distal end away from the case in a converging arrangement, wherein said conformable backing comprises a center of gravity between said distal end and said case and provides a fulcrum for the carrying bag holder on the supporting surface, wherein said center of gravity is proximate to said fulcrum, wherein said conformable backing is comprised of a plurality of conformable sides in said converging arrangement, said plurality of conformable sides comprising an upper side and a lower side extending from said longitudinal sides of said case and further comprising a pair of opposing sides extending from said lateral sides of said case and connected to said upper side and said lower side, wherein said lower side rests on the surface, wherein said upper side is further comprised of an opening facing away from said lower side and facing away from the surface when said lower surface rests on the surface, and wherein said opposing sides support said case and the computer at an acute angle relative to the surface;
  a compartment formed in said conformable backing, wherein said compartment holds the personal objects within said conformable backing;
  a carrying handle attached to at least one of said case and said conformable backing; and
  a cover connected to at least one of said case and said conformable backing, wherein said cover extends over the computer.

20. The carrying bag holder of claim 19, further comprising an internal framework within said conformable backing, wherein said internal framework provides increased support to said opposing sides in supporting said case and the computer, and wherein said distal end of said conformable backing is positioned away from said attachment portion of said case at a maximum distance greater than one half a length of said lateral sides of said case, said maximum distance measured from said attachment portion through said compartment.

\* \* \* \* \*